(12) United States Patent
Diab

(10) Patent No.: US 8,576,873 B2
(45) Date of Patent: Nov. 5, 2013

(54) SYSTEM AND METHOD FOR CONTROLLING POWER DELIVERED TO A POWERED DEVICE BASED ON CHANNEL IMPEDIMENTS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 954 days.

(21) Appl. No.: 11/606,292

(22) Filed: Nov. 30, 2006

(65) Prior Publication Data

US 2008/0129118 A1    Jun. 5, 2008

(51) Int. Cl.
*H04L 12/66* (2006.01)

(52) U.S. Cl.
USPC ........... 370/463; 370/419; 370/445; 455/402; 713/300

(58) Field of Classification Search
USPC ............. 713/300, 324, 320, 310; 439/620.18; 370/493, 352, 412, 468; 375/240.01
See application file for complete search history.

(56) References Cited

U.S. PATENT DOCUMENTS

| | | | |
|---|---|---|---|
| 6,125,048 A | 9/2000 | Loughran et al. | |
| 7,170,194 B2 | 1/2007 | Korcharz et al. | |
| 7,356,588 B2 * | 4/2008 | Stineman et al. | 709/224 |
| 7,363,525 B2 * | 4/2008 | Biederman et al. | 713/340 |
| 7,404,091 B1 * | 7/2008 | Gere | 713/300 |
| 7,445,507 B1 * | 11/2008 | Parker | 439/620.18 |
| 7,478,251 B1 | 1/2009 | Diab et al. | |
| 7,511,515 B2 * | 3/2009 | Herbold | 324/691 |
| 7,603,570 B2 | 10/2009 | Schindler et al. | |
| 7,664,972 B2 * | 2/2010 | Diab et al. | 713/300 |
| 7,793,124 B2 * | 9/2010 | Landry et al. | 713/300 |
| 7,814,340 B2 * | 10/2010 | Heath et al. | 713/300 |
| 7,989,976 B2 | 8/2011 | Diab et al. | |
| 2005/0102419 A1 * | 5/2005 | Popescu et al. | 709/238 |
| 2005/0132240 A1 * | 6/2005 | Stineman et al. | 713/300 |
| 2005/0262364 A1 | 11/2005 | Diab et al. | |
| 2006/0115007 A1 | 6/2006 | Karam et al. | |
| 2006/0149978 A1 | 7/2006 | Randall et al. | |
| 2006/0165110 A1 * | 7/2006 | Magendanz et al. | 370/419 |
| 2006/0239183 A1 * | 10/2006 | Robitaille et al. | 370/217 |
| 2007/0075586 A1 * | 4/2007 | Bogue | 307/66 |
| 2007/0113105 A1 * | 5/2007 | Campbell et al. | 713/300 |
| 2007/0296394 A1 * | 12/2007 | Landry et al. | 323/371 |
| 2008/0100467 A1 * | 5/2008 | Downie et al. | 340/686.2 |

FOREIGN PATENT DOCUMENTS

WO    2005/117337 A1    12/2005

OTHER PUBLICATIONS

Extended European Search Report, Jun. 2012.

* cited by examiner

*Primary Examiner* — Michael J Moore, Jr.
(74) *Attorney, Agent, or Firm* — Duane S. Kobayashi

(57) ABSTRACT

A system and method for discovering channel impediments for Power over Ethernet (PoE) applications. Cabling power loss in PoE applications is related to the resistance of the cable itself. A PHY can be designed to measure electrical characteristics (e.g., insertion loss, cross talk, length, discontinuities, etc.) of the Ethernet cable to enable determination of the cable resistance. The determined resistance can be used in powering decisions and in adjusting power budgets allocated to power source equipment ports.

10 Claims, 5 Drawing Sheets

SYSTEM AND METHOD FOR CONTROLLING POWER DELIVERED TO A POWERED DEVICE BASED ON CHANNEL IMPEDIMENTS

BACKGROUND

1. Field of the Invention

The present invention relates generally to network cabling systems and methods and, more particularly, to the discovery of channel impediments for power over Ethernet (PoE) applications.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices.

After a valid PD is discovered, the PSE can optionally perform a power classification. IEEE 802.3af defines five power classes for a PD device. The completion of this power classification process enables the PSE to manage the power that is delivered to the various PDs connected to the PSE. If a particular power class is identified for a particular PD, then the PSE can allocate the appropriate power for that PD. If power classification is not performed, then a default classification can be used where the PSE supplies the full 15.4 W of power onto the particular port.

Management of the power budgets that are allocated to the various PDs connected to the PSE is crucial for efficient operation of the PSE. Management of power budgets are even more critical in a PoE Broad Reach application where the PD is connected to the PSE using an Ethernet cable greater than 100 meters (e.g., 300-500 meters). In general, the total amount of power that can be allocated to the various PDs is limited by the capacity of the PSE. Thus, what is needed is a mechanism that enables the PSE to identify an accurate amount of power that should be budgeted on each port.

SUMMARY

A system and/or method for controlling power delivered to powered devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
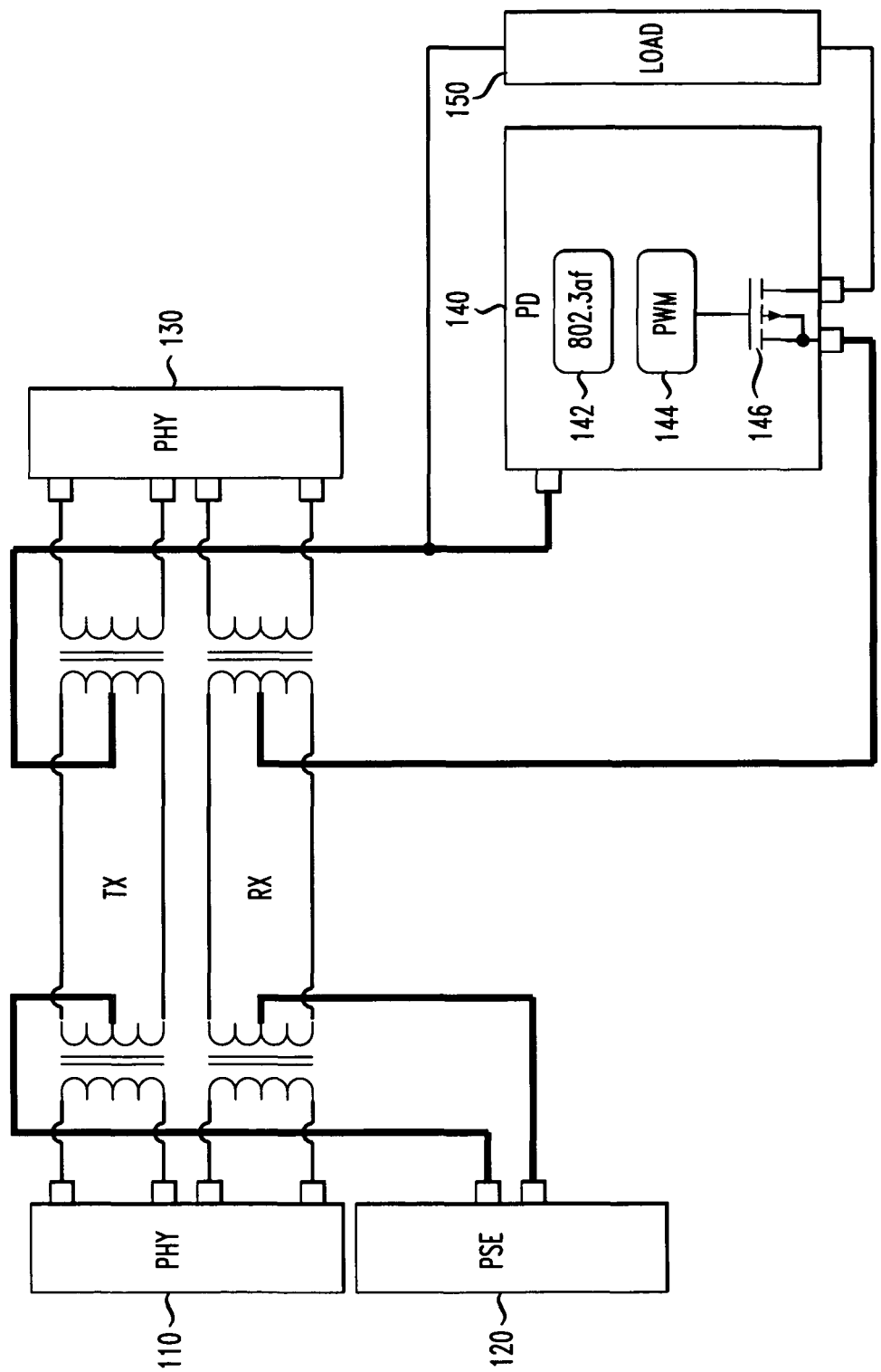
FIG. 1 illustrates an embodiment of a Power over Ethernet (PoE) system.

FIG. 1 illustrates an embodiment of a power over Ethernet (PoE) system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes 802.3af module 142. This module includes the electronics that would enable PD 140 to communicate with PSE 120 in accordance with the IEEE 802.3af standard. PD 140 also includes pulse width modulation (PWM) DC:DC controller 144 that controls power FET 146, which in turn provides constant power to load 150. In general, there are two types of loads: a purely resistive load (e.g., lamp) and a constant power load that is fed by a DC:DC power controller. The present application is primarily directed to constant power loads fed by a DC:DC power controller.

Figure 2A:
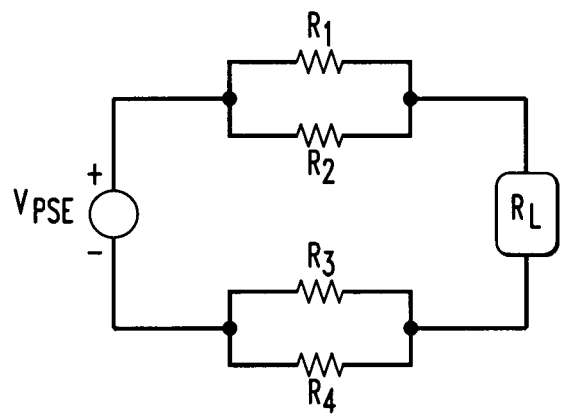
FIGS. 2A and 2B illustrate circuit diagrams that model the PoE system.

The delivery of power from PSE 120 to load 150 can be modeled by the circuit model illustrated in FIG. 2A. As illustrated, a power source provides a voltage $V_{PSE}$ to a circuit that includes a first parallel pair of resistors ($R_1$, $R_2$), a load resistance $R_{LOAD}$, and a second parallel pair of resistors ($R_3$, $R_4$). Here, the first parallel pair of resistors $R_1$, $R_2$ represents the resistances of the TX pair of wires, while the second parallel pair of resistors $R_3$, $R_4$ represents the resistances of the RX pair of wires.

The values of resistors $R_1$, $R_2$, $R_3$, and $R_4$ depend on the type and length of Ethernet cable. Specifically, the resistors $R_1$, $R_2$, $R_3$, and $R_4$ have a certain resistance/length that is dependent on a type of Ethernet cable (e.g., Category 3, 5, 6, etc.). For example, for Category 5 Ethernet cable, resistors $R_1$, $R_2$, $R_3$, and $R_4$ would have a resistance of approximately 0.1 Ω/meter. Thus, for a 100-meter Category 5 Ethernet cable, each of resistors $R_1$, $R_2$, $R_3$, and $R_4$ would have a value of 10Ω. In this example, parallel resistors $R_1$ and $R_2$ would have an equivalent resistance of 5Ω, while parallel resistors $R_3$ and $R_4$ would also have an equivalent resistance of 5Ω. In combination, the total value of the Ethernet cable resistance ($R_{cable}$) can then be determined as the sum of 5Ω+5Ω=10Ω. A simplified PoE circuit model that includes the single cable resistance value $R_{cable}$ is illustrated in FIG. 2B.

Figure 2B:
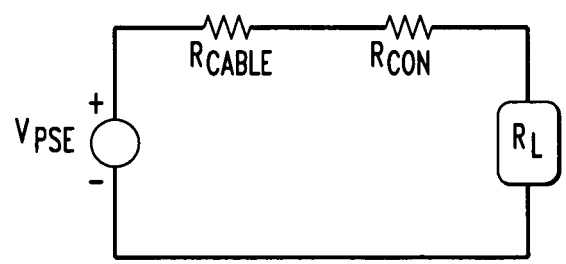
Figure 3:
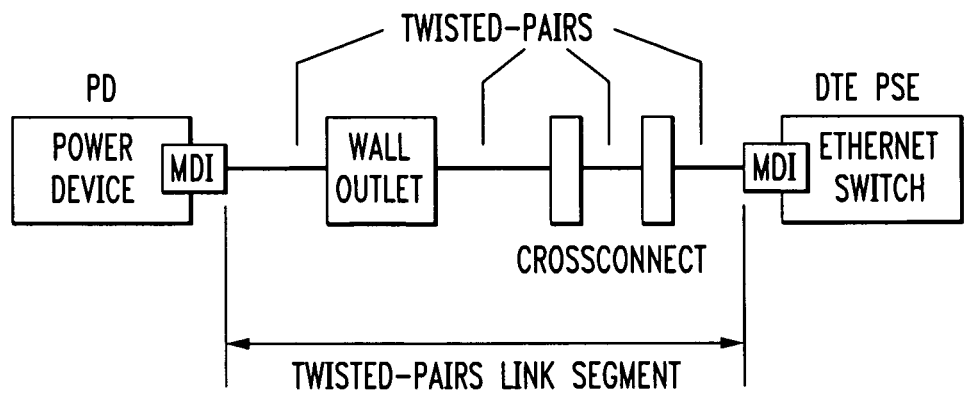
FIG. 3 illustrates a flowchart of a PoE process.

As FIG. 2B further illustrates, the circuit model also includes a series resistor $R_{con}$. The series resistor $R_{con}$ represents the resistance that is added due to the existence of connectors in the middle of a medium dependent interface (MDI) link. As illustrated in FIG. 3, the connectors in the middle of the MDI link can be introduced through the inclusion of a cross-connect system, wall outlet, or the like in the middle of the MDI link.

As noted above, the resistance $R_{cable}$ for Category 5 cable is approximately 0.1 Ω/meter. For 100 meters of Category 5 cable, the resistance $R_{cable}$ is therefore 10Ω. It should be noted that this approximation includes the resistance of the cable itself as well as the two end connectors. The contribution of the two end connectors to the cable resistance is approximately 0.5Ω.

Where the cable includes additional connectors in the middle of the MDI link, further resistance would be added to the circuit model. This contribution to the total resistance is represented as $R_{con}$ in the circuit model of FIG. 2B. For a loaded system that includes connectors in the middle of the MDI link, the value of $R_{con}$ can reach approximately 2.5Ω. As would be appreciated, the value of $R_{con}$ can represent a substantial contribution to the total resistance of the MDI link. Specifically, the 2.5Ω resistance of $R_{con}$ adds 25% to the total link resistance when added to the 10Ω resistance of $R_{cable}$ when calculated for 100 meters of Category 5 cable.

In the IEEE 802.3af standard, a PSE can optionally perform a classification step that identifies a power classification of the PD. Table 1 below shows the five PD classes supported by the IEEE 802.3af standard.

TABLE 1

| Class | Usage | Min Power Output by PSE | Max Power Input at PD |
|---|---|---|---|
| 0 | Default | 15.4 W | 0.44 to 12.95 W |
| 1 | Optional | 4.0 W | 0.44 to 3.84 W |
| 2 | Optional | 7.0 W | 3.84 to 6.49 W |
| 3 | Optional | 15.4 W | 6.49 to 12.95 W |
| 4 | Reserved | Act as Class 0 | Reserved |

As illustrated, the Class 0 (default) and Class 3 PD classifications specify the PSE's minimum output power as 15.4 W. For lower power PDs such as Class 1 and Class 2 devices, the PSE's minimum output power is specified as 4.0 W and 7.0 W, respectively. While optional, the identification of the correct PD power classification enables the PSE to budget only as much power as is needed on each port. This effectively increases the capacity of the PSE in supplying power to a set of connected PDs.

It is a feature of the present invention that the measurement of one or more characteristics of the Ethernet cable can be used to impact the operation of the PoE system. In one embodiment, the measured characteristics are used to identify one or more of a type of Ethernet cable, a length of Ethernet cable, and an existence of connectors in the middle of the MDI link. The identified type and length of the Ethernet cable along with the existence of connectors can then be used to estimate the resistance of the Ethernet cable. In turn, the estimated resistance of the Ethernet cable can be used to assess power losses in the cable, which impacts the power budget that is allocated for a particular PSE port.

Figure 4:
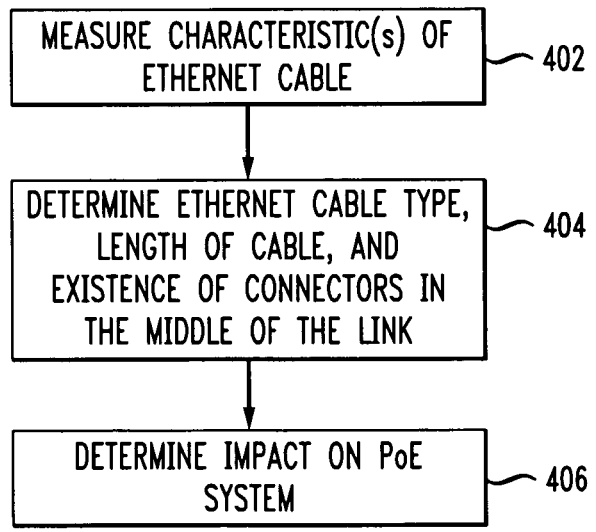
FIG. 4 illustrates an example of connectors in the middle of a medium dependent interface link.

To illustrate this general process of the present invention, reference is made to the flowchart of FIG. 4. As illustrated, the process begins at step 402, where one or more characteristics of an Ethernet cable are measured. In one embodiment, this measurement step can be implemented as part of the PHY's analysis of the electrical characteristics of the Ethernet cable. For example, the measurement step can be implemented as part of an echo cancellation convergence process implemented by the PHY.

In one embodiment, the one or more characteristics of the Ethernet cable that are measured at step 402 are those characteristics that would enable the PoE system to better estimate the resistance of the Ethernet cable. Here, the estimate of the actual cable resistance would enable the PoE system to estimate the actual power loss of the cable. In one embodiment, the PHY is designed to measure characteristics that would enable a determination of the insertion loss, cross talk, length and discontinuities in the Ethernet cable.

At step 404, after the one or more characteristics of the Ethernet cable are measured, the PoE system would then determine a type of Ethernet cable, length of Ethernet cable, and an existence of connectors in the middle of the link. The Ethernet cable type can be determined based on the measured insertion loss, cross talk, and length of the Ethernet cable. These measurements of the Ethernet cable would enable the PoE system to determine, for example, whether the Ethernet cable is a Category 3, 5, 6, or 7 Ethernet cable. In one embodiment, the existence of connectors in the middle of the link would be determined based on discontinuities identified using time domain reflectometry (TDR).

As would be appreciated, the different cable types have different resistances associated therewith. As noted, Category 3 Ethernet cable has a resistance of approximately 0.2 Ω/meter, while Category 5 Ethernet cable has a resistance of approximately 0.1 Ω/meter. The existence of connectors in the middle of the link would also add to the effective cable resistance. Once the type of Ethernet cable, length of Ethernet cable, and existence of connectors in the middle of the link is identified at step 404, the PoE system can then determine its impact on the PoE system at step 406.

As will be described in greater detail below, the particular impact on the PoE system can vary depending on the application. Here, it is a feature of the present invention that the cable type, cable length, and connector existence information can be used by the PoE system in a dynamic configuration or operation process. For example, the cable type, cable length, and connector existence information can be used to diagnose the Ethernet cable, determine whether power can be supplied to a PD, determine an adjustment to a power budget for a given PSE port, etc.

To illustrate different ways that the cable type, cable length, and connector existence information can impact a PoE system, consider a first application related to a conventional PoE system such as that supported by the IEEE 802.3af specification. In this application, the determination of the type and length of cable can be used to identify the resistance $R_{cable}$, while the determination of the existence of connectors in the middle of the link can be used to identify the resistance $R_{con}$ (See FIG. 2B).

In the circuit model of FIG. 2B, where the PD includes a DC:DC converter, the load $R_L$ would receive constant power, $P_L$, and see a voltage $V_L$ on its input. Since $P_L$ is fixed at the load, $P_L=I*V_L$, where I is the current going through the whole circuit. The power loss of the cable would then be $P_{loss}=I^2*(R_{cable}+R_{con})$.

In specifying the minimum output power of 15.4 W for the PSE, the IEEE 802.3af standard assumes a worst-case link resistance of 20Ω when the PD is connected to the PSE using 100 m of Category 3 cable. At a current limit of 350 mA, the worst-case power loss attributed to the cable is $P_{loss}=(350\text{ mA})^2*20Ω=2.45$ W. This worst-case power loss of 2.45 W is the difference between the PSE's minimum output power and the max power drawn by the PD (i.e., 15.4 W−12.95 W=2.45 W).

The worst-case power budget allocated to a PSE port can be adjusted based on a determination of a type of Ethernet cable. Specifically, without any additional knowledge of the PoE system, the identification of a type of Ethernet cable would yield a more accurate assessment of the power loss. For example, assume that the measured characteristics indicate that the PD is coupled to the PSE using Category 5 instead of Category 3 cable. Even assuming the existence of a loaded system (i.e., connectors in the middle of the link) along with worst-case assumptions of the cable length of 100 m and a current of 350 mA, the resistance of the cable would be estimated as 12.5Ω for Category 5 cable instead of 20Ω for Category 3 cable. The determined reduction in the resistance, would therefore reduce the power loss to $P_{loss}$=(350 mA)$^2$*12.5Ω=1.53 W. The difference as compared to the worst-case power loss would then be 2.45 W−1.53 W=0.92 W. The 0.92 W power savings would serve to reduce the power budget attributed to that port, thereby effectively increasing the capacity of the PSE.

A more accurate power loss assessment can also be gained through the determination of the cable length along with the determination of the cable type. In one embodiment, cable length is determined using TDR. With the additional cable length information, the estimated resistance of the cable can be further reduced from the worst case of a loaded system at 100 m. For example, assume that the type of cable is determined to be Category 5, and that it is further determined that the length of the cable is 50 m. In this example, $R_{cable}$ would be reduced by one half to 5Ω. The power loss attributed to the loaded link having 50 m of Category 5 cable would then be $P_{loss}$=(350 mA)$^2$*(5Ω+2.5Ω)=0.92 W. The corresponding power savings of 2.45 W−0.92 W=1.53 W would then serve to reduce the power budget allocated to that port. It should be noted that the determination of the cable length alone can produce power savings benefits such as those outlined above. While conventional systems may have contemplated the use of cable length determinations in typical PoE applications (i.e., under 100 m), the use of cable length determinations in PoE applications greater than 100 m is a unique feature of the present invention.

In accordance with the present invention, an even more accurate power loss assessment can also be gained through the additional determination of the existence (or absence) of connectors in the middle of the link. If it is determined that connectors do not exist in the middle of the link, then the resistance of the link would be further reduced as $R_{con}$=0. Specifically, the power loss attributed to an unloaded link having 50 m of Category 5 cable would then be $P_{loss}$=(350 mA)$^2$*(5Ω+0Ω)=0.61 W. The corresponding power savings of 2.45 W−0.61 W=1.84 W would represent an even greater savings of the power budget allocated to that port.

In general, a determination of factors such as the cable type, length of the cable, and existence of connectors in the middle of the link serve to reduce the power budget allocated to a PSE port. Significantly, these benefits can be achieved without any additional knowledge of the PoE system. More detailed power loss calculations can also be generated if additional information is available.

Across the cable, the voltage drop can be defined as $V_{PSE}-V_L=I*R_{total}$, where $R_{total}=R_{cable}+R_{con}$. This equation can be solved for the voltage $V_L$ allowed at the PD as follows:

$$V_{PSE}-V_L=I*R_{total}$$

$$V_{PSE}-V_L=(P_L/V_L)*R_{total}$$

$$V_{PSE}*V_L-V_L^2=P_L*R_{total}$$

$$V_L^2-V_{PSE}*V_L+P_L*R_{total}=0$$

$$V_L=[V_{PSE}+/-SQRT(V_{PSE}^2-(4*P_L*R_{total}))]/2$$

If $V_{PSE}$ is known to be 48V, $P_L$ is 12.95 W (max power allowed for PD), and $R_{total}=R_{cable}+R_{con}$=5Ω+2.5Ω=7.5Ω (resistance of 50 m of Category 5 cable for a loaded system), then $V_L$=(48+/−SQRT(48$^2$−4*12.95*7.5))/2=(48+1−43.77)/2=45.89V. The current can then be calculated using $V_{PSE}-V_L=I*R_{total}$, such that 48V−45.89V=I*7.5Ω results in I=0.281 A. The total power output by the PSE is then 12.95 W plus the power loss in the cable. The power loss in the cable in this case is I$^2$*$R_{total}$=(0.281 A)$^2$*7.5Ω=0.59 W. The total power budget attributed to the PSE port in this example would be 12.95 W+0.59 W=13.54 W. The power budget savings would then be 15.4 W−13.54 W=1.86 W.

As these examples illustrate, using worst-case cable assumption leads to an unnecessary waste in the power budget attributed to a port. When aggregated across all of the PSE's ports, the waste in the power budget serves to unnecessarily reduce the real powering capacity of the PSE.

A second application in which the principles of the present invention can be applied is a PoE+ application such as that supported by the future IEEE 802.3 at specification. The PoE+ application is designed to support higher-power PDs and assumes that Category 5 or better Ethernet cable is used. PDs of up to 30 W are being considered for two-pair PoE+ systems, while PDs of up to 56 W are being considered for four-pair PoE+ systems. As would be appreciated, the same principles would apply for both two-pair and four-pair systems. In general, the support for higher-power PDs with PoE+ would make equipment like WiMAX transmitters, pan-tilt-zoom cameras, videophones and thin clients possible.

In this application, the principles of the present invention can be used first as a diagnostic tool to validate the Ethernet cable that is connected to a PSE port. In one embodiment, the diagnostic tool would identify one or more characteristics of the Ethernet cable and use that information to determine how to handle a PoE+ PD device. For example, the PSE can be designed to make intelligent decisions about how much of a power budget to allocate to that port.

For conventional 802.3af installations, the worst-case power loss attributed to the cable is $P_{loss}$=(350 mA)$^2$*20Ω=2.45 W. This worst-case power loss is based on the current limit per PD of 350 mA due to cable and patch panel limitations and the 20Ω resistance of Category 3 Ethernet cable. In PoE+ installations that double the current, for example, the power loss attributed to the Category 5 cable would be $P_{loss}$=(700 mA)$^2$*10Ω=4.9 W=2*$P_{loss}$. As this simple calculation illustrates, the power loss/meter in PoE+ installations can be double that of conventional 802.3af installations, even factoring in the 50% reduction in the cable resistance. This power loss would be even greater for loaded systems that included connectors in the middle of the link. For this reason, the identification of the length of the Category 5 cable along with the existence of connectors in the middle of the link represent significant factors that enable an accurate determination of power budgets attributable to a port as compared to those based on worst-case power loss estimates in the cabling. For example, if the length of the cable is determined to be 25 m in an unloaded system, then the power loss at a current of 700 mA would be calculated as (700 ma)$^2$*2.5Ω=1.225 W. This is significantly lower than the power loss of 100 m of Category 5 cable in a loaded system where the power loss would be calculated as (700 ma)$^2$*(10Ω+2.5Ω)=6.125 W. Of course, the estimated power loss in the cable can be reduced even further if the actual current is estimated using, for example, information regarding $V_{PSE}$, $P_L$, $V_L$, and $R_{tot}$.

For example, assume there exists a loaded system of 100 m of Category 5 cable with connectors in the middle of the link.

Here, if $V_{PSE}$ is 50 V, $P_L$ is 20 W, and $R_{tot}=R_{cable}+R_{con}=10\Omega+2.5\Omega=12.5\Omega$, then $V_L$ can be calculated as $V_L=(50+/-\text{SQRT}(50^2-4*20*12.5))/2=(50+/-38.73)/2=44.36$V. The current can then be calculated using $V_{PSE}-V_L=I*R_{tot}$, such that $50\text{V}-44.36\text{V}=I*12.5\Omega$ results in I=0.451 A. Here, the estimated power loss of the cable is $I^2*R_{tot}=(0.451\text{ A})^2*12.5\Omega=2.54$ W, which can then be used to estimate the total power budget of 20 W+2.54 W=22.54 W, which is allocated to that port.

In another example, assume that $P_L$ is 20 W, $R_{tot}$ is determined to be $5\Omega$ (50 m, Category 5, unloaded), and $V_L$ is known to be 48V. As would be appreciated, $V_L$ can be communicated from the PD to the PSE using various communication means, such as some form of layer 2 communication. In this case, the current I can be calculated using $I=P_L/V_L=20$ W/48V=0.417 A. The estimated power loss of the cable is then $I^2*R_{tot}=(0.417\text{ A})^2*5\Omega=0.87$ W, which can then be used to estimate the total power budget of 20 W+0.87 W=20.87 W, which is allocated to that port.

Additionally, the power loss calculation can also benefit from cable type information that is also obtained for PoE+ installations. Here, the determination that the Ethernet cable is better than Category 5 cable (e.g., Category 6 or 7 Ethernet cable) would also serve to reduce the resistance estimate of the cable, thereby further reducing the estimated power loss.

A third application in which the principles of the present invention can be applied is a PoE Broad Reach (PoE-BR) application. In a PoE-BR application, the PD can be connected to the PSE with more than 100 m of Ethernet cable. For example, a PoE-BR application can be defined to support distances up to 500 m or beyond.

In a PoE-BR application, the determination of a type of Ethernet cable can provide simple benefits in extending the reach of existing PoE applications. Consider, for example, the worst-case 802.3af application that powers a PD over 100 m of Category 3 cable. In this worst-case application, the resistance of the cable is approximately $20\Omega$. If Category 5 cable is used instead, then the lower resistance of the Category 5 cable can allow a greater length of Category 5 cable while still meeting the equivalent $20\Omega$ resistance. For example, assume a worst-case Category 5 cable that includes connectors in the middle of the link. In this scenario, the resistance attributed to the Ethernet cable would be approximately $12.5\Omega$. With this estimate, the length of the Category 5 cable can be extended to 100 m*$20\Omega$/$12.5\Omega$=160 m in matching the $20\Omega$ resistance. Further, if it is determined that connectors do not exist in the middle of the link, then the length of the Category 5 cable can be extended to 100 m*$20\Omega$/$10\Omega$=200 m in matching the $20\Omega$ resistance. Thus, even without any knowledge of the operation of the PoE system, the identification of factors such as the cable type and the existence of connectors in the middle of the link can lead to a PD being powered at a length greater than 100 m.

In general, the increase in distance between the PSE and PD (e.g., up to 500 m) creates a greater range of potential operation in the PoE-BR system. This range of operation makes it increasingly difficult to provide system specifications using worst-case operating parameters. For example, assume that Category 3 cable is supported by the PoE-BR specification. In addressing this scenario, the resistance of the cable could be specified as $20\Omega$-$100\Omega$. Clearly, assuming a $100\Omega$ worst-case cable resistance would be impractical in identifying power budgets such as that listed in Table 1. The Category 5 cable specification would also suffer since the resistance of the cable could be specified as $10\Omega$-$50\Omega$.

It is therefore a feature of the present invention that powering of a PD in a PoE-BR application can be based at least in part on considerations of a particular port installation. For example, assume that it is known that $V_{PSE}$ is 51V, the PD will consume a constant 12.95 W, and that the PD's voltage is 37V. In this case, the current can be calculated as $I=P_L/V_L=12.95$ W/37V=0.34 A. The maximum resistance for the cable is then calculated as $R_{tot}=(V_{PSE}-V_L)/I=(51\text{V}-37\text{V})/0.34\text{ A}=41\Omega$.

With the maximum resistance of $R_{tot}=41\Omega$, the PoE-BR system can then determine whether a particular port can accommodate such an installation. For example, if it is determined that Category 3 cable is used, then the PD can be powered at a distance of up to about 205 meters. Similarly, if it is determined that Category 5 cable is used, then the PD can be powered at a distance of up to about 410 meters assuming an unloaded system.

The identification of the existence of connectors in the middle of the link can also affect these determinations. For example, if Category 5 cable is used, then the maximum resistance $R_{tot}$ would be apportioned across $R_{cable}$ and $R_{con}$. If $R_{con}=2.5\Omega$, then the maximum resistance apportioned to $R_{cable}$ would be $41\Omega-2.5\Omega=38.5\Omega$. In this example, the PD can be powered at a distance of up to about 385 meters when Category 5 cable is used.

The cable length and existence of connector information can also be used to determine the power loss attributable to the cable. For example, if it is determined that the Category 5 cable is 375 meters in a loaded system, then the resistance of the cable would be approximately $37.5\Omega+2.5\Omega=40\Omega$. The power loss would then be calculated as $P_{loss}=(340$ mA$)^2*40\Omega=4.62$ W. The total power budget for that port would then be 12.95 W+4.62 W=17.57 W.

As noted above, the power budget attributable to the port can vary widely due to the range of distances being served by the PoE-BR application. For example, if 120 meters of Category 5 cable was being used in an unloaded system, then the resistance of the cable would be approximately $12\Omega$. The power loss would then be calculated as $P_{loss}=(340$ mA$)^2*12\Omega=1.39$ W. The total power budget for that port would then be 12.95 W+1.39 W=14.34 W. The 3.23 W difference (i.e., 17.57 W−14.34 W) between the power budgets in the two scenarios illustrates the benefit of having some insight into factors such as the type of cable, length of cable, and existence of connectors in the middle of the link instead of relying on basic worst-case assumptions.

Due to the large range of cable resistances in a PoE-BR application, the minimum voltage of the PD may be lowered as compared to conventional 802.3af PoE. For example, assume that the minimum voltage at the PD is lowered to 30V. This 30V value can be used to validate a given port installation when the cable type information, cable length information, and existence of connectors in the middle of the link is known. It should be noted that the PD can have a higher requirement for the turn-on voltage as compared to the minimum voltage. This can be the case because during turn on, the PD is not drawing full power so the voltage at the PD is almost the same as the PSE.

Assume that $V_{PSE}=50$V, $P_L=12.95$ W, and $R_{tot}=45\Omega$ (425 meters of Category 5 cable in a loaded system). For this set of operating parameters, $V_L$ can be calculated as $V_L=(50+/-\text{SQRT}(50^2-4*12.95*45))/2=(48+/-13)/2=30.5$V. After calculating $V_L$, the PoE-BR system can then determine whether the calculated voltage $V_L$ is permissible in light of the minimum voltage. In this case, $V_L=30.5$V is above the minimum threshold so the PoE-BR system would validate the port under those operating conditions. With respect to the power budget allocated to that port, the PoE-BR system would calculate the current using $V_{PSE}-V_L=I*R_{cable}$, such that $50\text{V}-30.5\text{V}=I*45\Omega$ results in I=0.433 A. The power loss in the cable can be calculated as $I^2*R_{cable}=(0.433\text{ A})^2*45\Omega=8.44$ W. The total power budget attributed to the PSE port in this example would then be 12.95 W+8.44 W=21.39 W.

With the principles of the present invention, the overly penal effects of using worst-case resistances in PoE-BR links would be minimized. First, savings in power budgets allocated to particular ports would be achieved, thereby increasing a PSE's overall capacity. Second, the PSE can validate port installations that would be excluded when using worst-case estimates of cable resistances.

A fourth application in which the principles of the present invention can be applied is in the general diagnostic of a cabling infrastructure. This diagnostic can be entirely unrelated to PoE applications. In general, the diagnostic tool can be applied to the cabling infrastructure to determine the capability of the cabling infrastructure for a given application. In the previously discussed application, the diagnostic tool was used to determine the capability of the cabling infrastructure to handle a PoE-BR application. In a similar manner, the diagnostic tool can be used to determine the capability of the cabling infrastructure to handle an application such as 10GBASET as defined by IEEE 802.3an. Here, the 10GBASET would require Category 7 Ethernet cabling. In accordance with the principles of the present invention, the diagnostic tool can identify all Category 7 Ethernet cables, as well as all Ethernet cables below Category 7 (i.e., Category 5 or 6) that could possibly handle the 10GBASET communications. Moreover, through the identification of the existence of connectors, the diagnostic tool can determine whether multiple cables exist in a link. This determination can further affect the determination of whether the cable link can handle a particular application.

As noted above, one or more characteristics of the Ethernet cable are measured to enable the PoE system to estimate the resistance of the Ethernet cable link, and ultimately to estimate the actual power loss of the Ethernet cable link. To facilitate such an estimate, the PoE system can measure such characteristics as the insertion loss, cross talk, length, discontinuities, etc. of the Ethernet cable. The measurement of the insertion loss, cross talk, length, and discontinuities of the Ethernet cable represents one example of the characteristics that can be used to estimate the cable resistance, and hence the power loss in the cable.

In one embodiment, cable length and discontinuities can be determined directly using TDR. In an alternative embodiment, cable length can be determined indirectly based on data generated in the measurement of insertion loss using a round trip of the injected signal. Here, the time interval between launching and receiving the pulse(s) is linearly proportional to the cable length. The cable length can then be computed by multiplying the propagation speed with the time interval, then divided by two to account for the round-trip delay. As would be appreciated, the existence of connectors can be inferred based on high frequency TDR measurements that identify discontinuities (or impediments) in the cable.

As has been described, various cable characteristics can be used to determine a cable type, cable length, and existence of connectors in the middle of the link. These factors enable a determination of the resistance and power loss of the cable link. As would be appreciated, other characteristics beyond those described above could also be used to enable the PoE system to determine the resistance and power loss of the cable link. Regardless of the measurement data that is used, it is significant that the PoE system can use the data to adjust some aspect of configuration or operation of the PoE system dynamically. As described above, this feature of the present invention is useful in a variety of applications.

Figure 5:
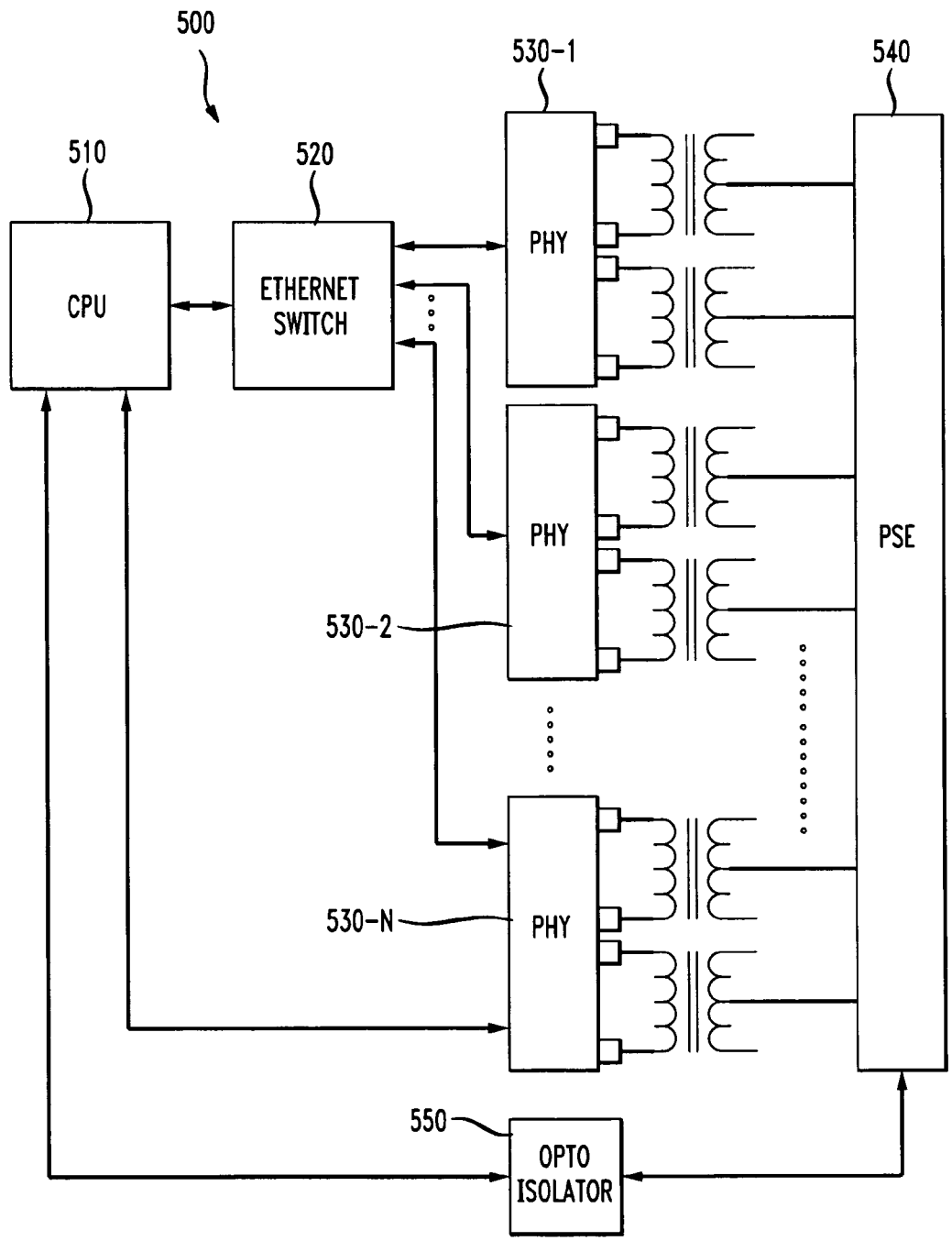
FIG. 5 illustrates an embodiment of a PoE system that enables communication of cable characteristic information from a PHY to a PSE.

FIG. 5 illustrates an embodiment of a PoE environment 500 in which the principles of the present invention can be implemented. As illustrated, environment 500 includes PHYs 530-1 to 530-N that are each connected to Ethernet switch 520. While a PHY can include one or more Ethernet transceivers, the wiring for only a single transceiver is illustrated as being connected to PHY 530-N. Each PHY is also connected to CPU 510, although only a single connection from CPU 510 to PHY 530-N is shown for simplicity. In one embodiment, CPU 510 is incorporated along with Ethernet switch 520 and PHYs 510-1 to 510-N on a single chip. In another embodiment, Ethernet switch 520 and PHYs 510-1 to 510-N are incorporated on a single chip separate from CPU 510, wherein communication with CPU 510 is enabled via a serial interface. Also illustrated in PoE environment 500 is a PSE 540 that provides power through the center taps of the transformers shown. As illustrated, PSE 540 is also coupled to CPU 510. In one embodiment, PSE 540 is coupled to CPU 510 via opto-isolator 550 that facilitates an isolation boundary.

Figure 6:
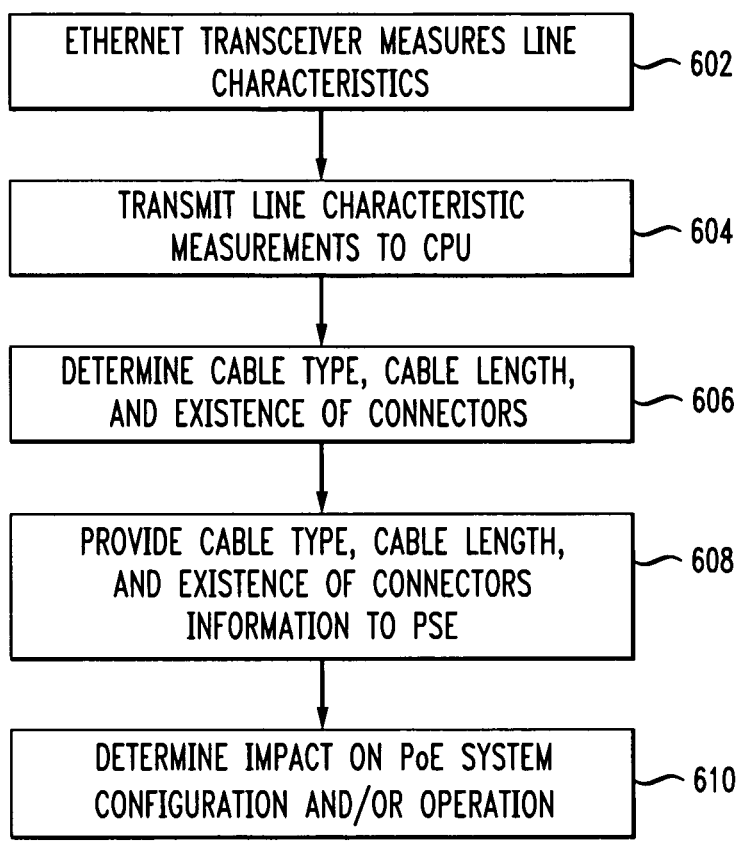
FIG. 6 illustrates a flowchart of a process for communicating cable characteristic information from a PHY to a PSE.

To illustrate the operation of PoE environment 500 in implementing the principles of the present invention, reference is now made to the flowchart of FIG. 6. As illustrated, the flowchart of FIG. 6 begins at step 602 where a transceiver in PHY 530-N measures line characteristics of an Ethernet cable coupled to PHY 530-N. In one embodiment, measurements that enable a determination of insertion loss, cross talk, cable length, and discontinuities are taken during an echo canceller convergence process performed by an echo canceller module under control of CPU 510. Line characteristic measurements taken by the transceiver are then transmitted to CPU 510 at step 604.

Next, at step 606, CPU 510 uses the line characteristic measurement data to determine the cable type, cable length, and existences of connectors in the middle of the link. This cable type information, cable length information, and existence regarding the existence of connectors in the middle of the link is subsequently provided to PSE 540 at step 608. Here, it should be noted that PSE can also be configured to determine the cable type, cable length, and existence of connectors using the line characteristic measurement data.

Regardless of where the cable type, cable length, and existence of connectors in the middle of the link is determined, its availability to PSE 540 would enable PSE 540 to determine its impact on the PoE system configuration and/or operation. This impact determination can consider the cable type, cable length, and existence of connectors in the middle of the link, and hence resistance of the cable, in combination with other PoE system parameters such as $V_{PSE}$, $P_L$, $V_L$, etc. As would be appreciated, the impact analysis can be performed by any system element that is responsible for diagnosing the Ethernet cable, determining whether power can be supplied to a PD, determining an adjustment to a power budget for a given PSE port, etc. In general, the impact analysis can be based on one or more parameters such as the cable link resistance, cable current, $V_{PSE}$, $P_L$, $V_L$, that can either be communicated, discovered, or assumed by the appropriate system element. For example, one or more parameters can be based on a system specification (e.g., IEEE 802.3af), derived through one or more calculations using measurement data (e.g., cable resistance derived from determined cable type and length), or received from another system element with knowledge of such a parameter (e.g., $V_L$ communicated to the PSE by the PD).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a power over Ethernet system that delivers power from a power source equipment to a powered device, said power over Ethernet system being designed for cable lengths up to a maximum of 100 meters, comprising:
   upon connection of said powered device to a power source equipment port via an Ethernet cable link that has a length greater than said maximum length of 100 meters, measuring by a cable detection component in said power source equipment, electrical characteristics of said Ethernet cable link;
   determining whether connectors exist in a middle of said Ethernet cable link, said determining being based on an identification of discontinuities in said Ethernet cable link based on said measured electrical characteristics;
   validating an installation of said power source equipment port prior to a delivery of power to said powered device over said Ethernet cable link, said validation including estimating a resistance of said Ethernet cable link using said determined existence of said connectors, identifying a new maximum cable length limit greater than 100 meters, and determining whether a length of said Ethernet cable link is less than said new maximum cable length limit to produce a validation result that determines whether to initiate said delivery of power to said powered device over said Ethernet cable link; and
   if it is determined that said delivery of power is to be initiated, then allocating a power budget to said power source equipment port, said allocated power budget being determined based on said determined existence of said connectors.

2. The method of claim 1, wherein said allocated power budget is based on a cable type, cable length, and an existence of connectors in the middle of said Ethernet cable link.

3. The method of claim 1, wherein said identifying comprises dividing a worst case estimate of a resistance for a port installation using 100 meters of Category 3 cable divided by said estimated resistance of said Ethernet cable link.

4. The method of claim 1, wherein said determining comprises determining after detecting a presence of said powered device and after classification of said powered device.

5. A power over Ethernet system, comprising:
   a powered device detection component that detects a presence of a powered device, said powered device coupled to a power source equipment port via an Ethernet cable link;
   a cable detection component that measures an electrical characteristic of said Ethernet cable to identify an existence of connectors on said Ethernet cable link, wherein said cable detection component measures discontinuities in said Ethernet cable link; and
   a power controller that validates an installation of said power source equipment port prior to a delivery of power to said powered device over said Ethernet cable link, said validation using said identified existence of said connectors to produce a validation result that determines whether said power controller is to initiate a delivery of power to said powered device over said Ethernet cable link, wherein said validation is for an Ethernet cable link having a length greater than 100 meters and compares characteristics of said Ethernet cable link to a cable validation limit that is derived by dividing a worst case estimate of a resistance for a port installation using 100 meters of Category 3 cable by a resistance of said Ethernet cable link with connectors, wherein if said power controller initiates said delivery of power, said power controller allocates a power budget to said power source equipment port, said power budget being determined based on said identified existence of connectors in said Ethernet cable link.

6. The power over Ethernet system of claim 5, wherein said power controller allocates a power budget to said power source equipment port based on a cable type, cable length, and said existence of connectors.

7. A method in a power over Ethernet system that delivers power from a power source equipment to a powered device, comprising:
   upon connection of said powered device to a power source equipment port via an Ethernet cable link that has a length greater than 100 meters, measuring by a cable detection component in said power source equipment, electrical characteristics of said Ethernet cable link;
   determining whether connectors exist in a middle of said Ethernet cable link, said determining being based on an identification of discontinuities in said Ethernet cable link based on said measured electrical characteristics;
   validating an installation of said power source equipment port, said validation including estimating a resistance of said Ethernet cable link using said determined existence of said connectors, identifying a cable length limit greater than 100 meters, and determining whether a length of said Ethernet cable link is less than said cable length limit; and
   allocating a power budget to said power source equipment port based on said determined existence of said connectors.

8. The method of claim 7, wherein said allocated power budget is based on a cable type, cable length, and said determined existence of said connectors.

9. The method of claim 7, wherein said identifying comprises dividing a worst case estimate of a resistance for a port installation using 100 meters of Category 3 cable divided by said estimated resistance of said Ethernet cable link.

10. The method of claim 7, wherein said determining comprises determining after detecting a presence of said powered device and after classification of said powered device.

* * * * *